April 14, 1970    O. E. SCHOW III    3,506,847
LOGARITHMIC CONVERTER
Filed Nov. 1, 1967

INVENTOR.
O. E. Schow, III
BY
ATTORNEY.

3,506,847
LOGARITHMIC CONVERTER

O. E. Schow III, Oak Ridge, Tenn., assignor to the United States of America as represented by the United States Atomic Energy Commission
Filed Nov. 1, 1967, Ser. No. 679,829
Int. Cl. G06g 7/12
U.S. Cl. 307—230  3 Claims

ABSTRACT OF THE DISCLOSURE

This invention has provided a logarithmic converter whose linear range is accurately extended from the present $10^{-12}$ amperes to currents near $10^{-15}$ amperes by inserting a resistor in the base circuit of a transistor of an otherwise conventional operational amplifier feedback loop and applying a small stable bias to the transistor base.

BACKGROUND OF THE INVENTION

This invention was made during the course of, or under, a contract with the U.S. Atomic Energy Commission.

This invention relates generally to a logarithmic converter circuit and more particularly to a logarithmic converter with an extended linear response range.

A logarithmic converter is an instrument that provides an output signal which is directly proportional to the logarithm of the input signal. Although the input may be either a voltage or a current, a current input is most common with the output being a voltage, for example, 60 millivolts output for each decade of input current. There are units available which give a linear response to within 5% of input currents that range from $10^{-2}$ to approximately $10^{-12}$ amperes. One such unit is disclosed in U.S. Patent 3,237,028, filed Feb. 21, 1963, by James F. Gibbons, entitled "Logarithmic Transfer Circuit." These circuits utilize a transistor in the feedback network of an operational amplifier. As discussed above, these circuits are linear over a range of approximately nine decades ($10^{-2}$ to $10^{-12}$ amperes). At currents outside of this range, the response is substantially in error. Accordingly, this type of instrument cannot be used directly on very small current signals as might be obtained from monitoring instruments in and around nuclear reactors, from detectors in spectrometers, in certain computer applications, etc.

Accordingly, it is an object of the present invention to provide a logarithmic converter having an extended linear range with improved accuracy.

Other objects and advantages of the present invention will become apparent upon a consideration of the following description and the accompanying drawings.

SUMMARY OF THE INVENTION

The conventional converter circuit consists of an operational amplifier with a feedback transistor connected between the input and the output of the operational amplifier. It has been found that the linear range of logarithmic conversion can be extended down to input currents approaching $10^{-15}$ amperes by connecting a predetermined value bias resistor between the base lead of the feedback transistor and ground potential, and connecting a regulated voltage supply to the base of the transistor. With this voltage supply, it is possible to adjust the base voltage over a range of voltages, either positive or negative. The bias on the base lead allows the emitter to inject or to remove the electrical carriers as needed for low current linear range of the logarithmic conversion process. For example, when the output of the operational amplifier goes negative, carriers are injected; when the output of the amplifier goes positive, carriers are removed from the device.

BRIEF DESCRIPTION OF THE DRAWINGS

Referring now to FIG. 1, a conventional logarithmic converter of the prior art is shown. The converter consists of an operational amplifier 5 having a pair of input terminals and an output terminal. One of the input terminals of amplifier 5 is connected to ground potential by means of lead 7. A signal current source $I_{in}$ is connected to the other input terminal by means of lead 9. A feedback transistor 11 is connected between the ungrounded input and the output of amplifier 5. In the configuration shown in FIG. 1, the converter converts an input current signal to a voltage signal $E_{out}$ at the output of amplifier 5 which is proportional to the logarithm of the input. Therefore, the collector of transistor 11 is connected to the input of amplifier 5 while the emitter is connected to the output; the base of transistor 11 being directly grounded.

In operation, the amplifier 5 is selected to have a very high input impedance and a very high amplification range so that a relatively small input signal will be greatly amplified in the output. The output voltage is applied to the emitter of transistor 11 turning it "ON," causing a large proportion of the current at the input to flow to the collector of the feedback transistor 11 and only a small portion of the current to flow into the amplifier. A curve of the collector current $I_c$ versus the emitter-base junction voltage $V_{eb}$ with the collector-base voltage $V_{cb}$ approximately zero gives a linear log relationship over a range of collector currents, approximately 9 or 10 decades, as shown by curve A in FIG. 3.

Figure 1:
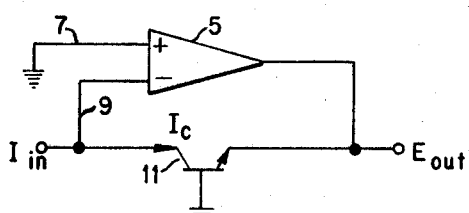
FIG. 1 is a schematic diagram of a prior art logarithmic converter.
Figure 2:
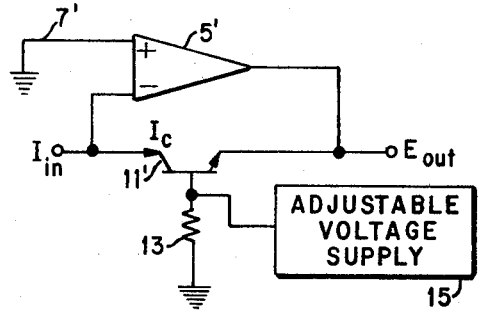
FIG. 2 is a schematic diagram of an improved logarithmic converter according to the present invention.

Referring now to FIG. 2, there is shown a logarithmic converter circuit according to the present invention which provides an extended linear range of logarithmic conversions and is more accurate. As shown, the circuit consists of the conventional operational amplifier 5' having a pair of input terminals and an output terminal. As in FIG. 1, one of the inputs of amplifier 5' is connected to ground potential by means of lead 7'. A feedback transistor 11' is connected, as in FIG. 1, between the ungrounded input and the output of amplifier 5'. It has been found that the logarithmic relationship can be extended to very small currents, approaching $10^{-15}$ amperes, when a slight bias is applied to the base of transistor 11'. This is accomplished by the addition of a bias resistor 13 between the base electrode of the transistor and ground potential. Further, the base is then connected to a variable bias voltage supply 15 of $\pm$ a few millivolts. The exact value of this bias depends upon operational parameters, particularly upon temperature since the slope of the response curve is affected by temperature. With proper adjustment, however, the response can be maintained accurately to follow the theoretical curve to the limits of the operational amplifiers. In research to date, no indication has been seen of the transistor limiting the response down to $10^{-14}$ amperes. The residual summing current of the amplifier is the limiting factor at this time. The amplifier may be, for example, a commercially available amplifier such as the Philbrick Researches, Inc. Model SP–2B operational amplifier. The gain of this amplifier is very high, approximately $2 \times 10^4$, so that the output voltage $E_{out}$ divided by the amplifier gain, $A_v$, will be approximately zero, which is essentially $V_{cb}$ or the input voltage due to the current $I_{in}$.

Figure 3:
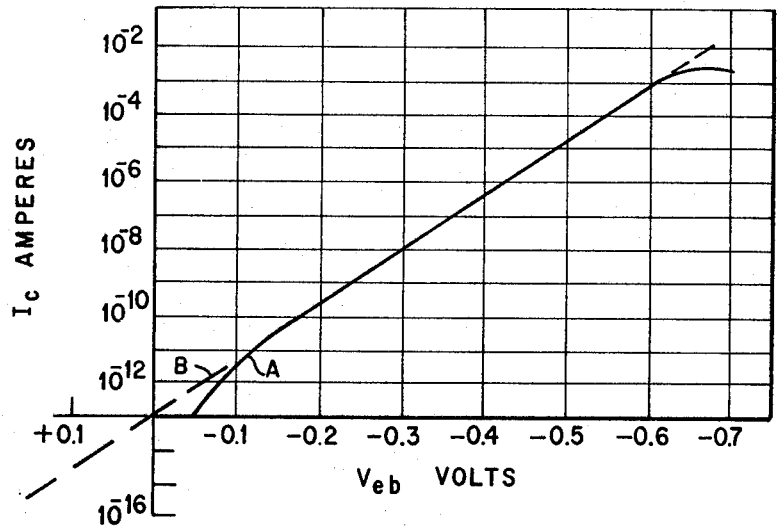
FIG. 3 is a graphic illustration of the response of a converter of the prior art and that of the subject converter.

In operation, the improved converter has a performance essentially the same as that of the prior art circuit of FIG. 1 for input currents in the range of from approximately $10^{-2}$ down to $10^{-12}$ amperes. Beyond this previous lower limit, as shown in FIG. 3, curve A, the conventional converter is in error. As shown by the dotted line B, the response of the present converter is made linear even with the transition through zero volts of $V_{eb}$. The system forces the emitter potential to the left side of FIG. 3 such that the emitter is reverse biased. The emitter is, in fact, removing carriers rather than generating carriers. Depending upon the specific characteristics of the transistor used and the ambient temperature of the transistor, the device may require a positive or negative base bias with a transition through zero volts. Since the bias adjustment affects only the low current response and not that of higher currents, it can be seen that the response of the circuit can be adjusted to follow the curve B of FIG. 3 to the limits of the operational amplifier 5'. Further, the circuit can be made to respond more accurately at elevated temperatures where the normal thermal generation of carriers is in excess of what is needed to balance the system.

In test models of the subject converter the accuracy of this unit has been determined to be ±1 percent per decade from $10^{-14}$ amperes to $10^{-3}$ amperes of input current.

The circuit construction according to FIG. 2 includes an operational amplifier, for example, a Philbrick Researches, Inc. Model SP–2B, a 2N930 transistor, a base bias resistor of 10 ohms, and a regulated variable voltage supply having a range of +100 millivolts to −100 millivolts can be obtained by the use of a voltage divider from the +15v. and −15v. regulated power supply for the amplifier.

Thus, it will be seen that an improved logarithmic converter has been provided which has a linear logarithmic response range at least two decades lower than previously obtained with converters of the prior art and has improved accuracy over that of the prior art converters.

It should be noted that since the present converter described has been with respect to a current input and a voltage output proportional to the logarithm of the input, a converter with generally similar operating characteristics having a voltage input and a current output can be provided with the use of an appropriate operational amplifier and inverting the collector and emitter connection of the feedback transistor.

In view of the above and numerous other equally possible modifications, the scope of the invention should be considered limited only by the following claims attached to and forming a part of this specification.

What is claimed is:

1. A logarithmic converter circuit which provides an output signal directly proportional to the logarithm of an input signal applied thereto, comprising: an amplifier with an input and an output, a feedback transistor having a collector, emitter and base electrodes, said collector and emitter electrodes being connected between said input and said output of said amplifier so that said feedback transistor provides a signal of opposite polarity to said input signal and having substantially the same magnitude as said input signal, a resistor connected between said base electrode of said feedback transistor and ground potential, and means connected to said base electrode of said feedback transistor for supplying a regulated bias voltage to said base electrode to extend the linear logarithmic range of said converter circuit.

2. A logarithmic converter circuit as set forth in claim 1 wherein the collector terminal of said feedback transistor is connected to the input of said amplifier to supply current to the input of said amplifier and said emitter electrode of said feedback transistor is connected to the output of said amplifier to receive said voltage signal at the output of said amplifier.

3. A logarithmic converter as set forth in claim 2 wherein said means for supplying a regulated voltage bias includes a variable voltage supply which is variable in the millivolt range, and said variable voltage supply having both a positive and negative output range with a transition through zero volts whereby the base bias voltage of said feedback transistor is adjusted to linearly extend the current output range of said feedback transistor for extremely small collector currents.

References Cited

UNITED STATES PATENTS 3,361,975   1/1968   Rorden et al. _____ 328—145

OTHER REFERENCES

"A Circuit With Logarithmic Transfer Response Over Nine (9) Decades," by Gibbons & Horn, Reprint from IEEE Transactions of the Circuit Theory Group, vol. CT–11, No. 3, September 1964, pages 379–385.

JOHN S. HEYMAN, Primary Examiner

H. A. DIXON, Assistant Examiner

U.S. Cl. X.R.

328—145